June 23, 1953 O. V. WELLS ET AL 2,643,169

VENDING MACHINE

Filed April 5, 1946 9 Sheets-Sheet 1

INVENTORS
OLGA V. WELLS
ROBERT O. BORST
BY CHESTER C. STAPP
Minier and Fike
ATTORNEYS INVENTORS
OLGA V. WELLS
ROBERT O. BORST
CHESTER C. STAPP
BY
Minier and Fike
ATTORNEYS

VENDING MACHINE

Filed April 5, 1946 9 Sheets-Sheet 3

INVENTORS
OLGA V. WELLS
ROBERT O. BORST
CHESTER C. STAPP
BY
Minier and Fike
ATTORNEYS June 23, 1953 O. V. WELLS ET AL 2,643,169

VENDING MACHINE

Filed April 5, 1946 9 Sheets-Sheet 4

INVENTORS
OLGA V. WELLS
ROBERT O. BORST
CHESTER C. STAPF
BY Minier and Fiske
ATTORNEYS June 23, 1953

O. V. WELLS ET AL 2,643,169

VENDING MACHINE

Filed April 5, 1946

9 Sheets-Sheet 5

INVENTORS
OLGA V. WELLS
ROBERT O. BORST
CHESTER C. STAPP
BY
Mimier and Fike
ATTORNEYS INVENTORS
OLGA V. WELLS
ROBERT O. BORST
CHESTER C. STAPP
BY Minier and Fike
ATTORNEYS INVENTORS
OLGA V. WELLS
ROBERT O. BORST
CHESTER C. STAPP
BY
Minier and Fike
ATTORNEYS June 23, 1953 O. V. WELLS ET AL 2,643,169

VENDING MACHINE

Filed April 5, 1946 9 Sheets-Sheet 8

INVENTORS
OLGA V. WELLS
ROBERT O. BORST
CHESTER C. STAPP
BY Minier and Fike
ATTORNEYS

VENDING MACHINE

Filed April 5, 1946 9 Sheets-Sheet 9

INVENTORS
OLGA V. WELLS
ROBERT O. BORST
BY CHESTER G. STAPP
Mimer and Fike
ATTORNEYS Patented June 23, 1953

2,643,169

UNITED STATES PATENT OFFICE 2,643,169

VENDING MACHINE

Olga V. Wells, Alhambra, Robert O. Borst, Pasadena, and Chester C. Stapp, Los Angeles, Calif.

Application April 5, 1946, Serial No. 659,952

1 Claim. (Cl. 312—94)

This invention relates to vending machines and has for its primary object to provide a machine for holding eatables, both hot or cold, for maintaining said eatables in the same condition as when placed in the machine until dispensed or vended, and to vend selective portions of said eatables quickly and efficiently.

Another object of this invention is to provide a vending machine incorporating a food compartment sealed to conserve the temperature of food therein and also treated to be vermin-proof.

Another object of the invention is to provide improved and novel means for storing a variety of packages or quantities of food in a vending machine whereby ready selection among said packages may be easily made for dispensing of said selection from the machine.

Another object of the invention is to provide a vending machine incorporating novel and effective vending means of a selected package of food from among a variety of packages.

Another object of the invention is to provide novel tray means for holding and thereby storing packages of different foods whereby vending of said packages, selectively, is facilitated.

A further object of the invention is to provide a vending machine embodying novel structural features to provide an effective and inexpensive structure for preserving the condition of food therein, giving ready access to the interior thereof for servicing and repairs, and providing for visibility of foods stored therein.

A further object of the invention is to provide, in a vending machine, effective means for controlling the selection of food for dispensing whereby one of a large variety of different foods may be readily selected and dispensed in a quick and sure manner.

The invention further includes the details, arrangement and combination which is illustrated in the accompanying drawings which, by way of example or illustration only, show a vending machine embodying the principles of the present invention. Other objects, features and advantages will appear from the following description of that embodiment of the invention which is illustrated.

Figure 3:
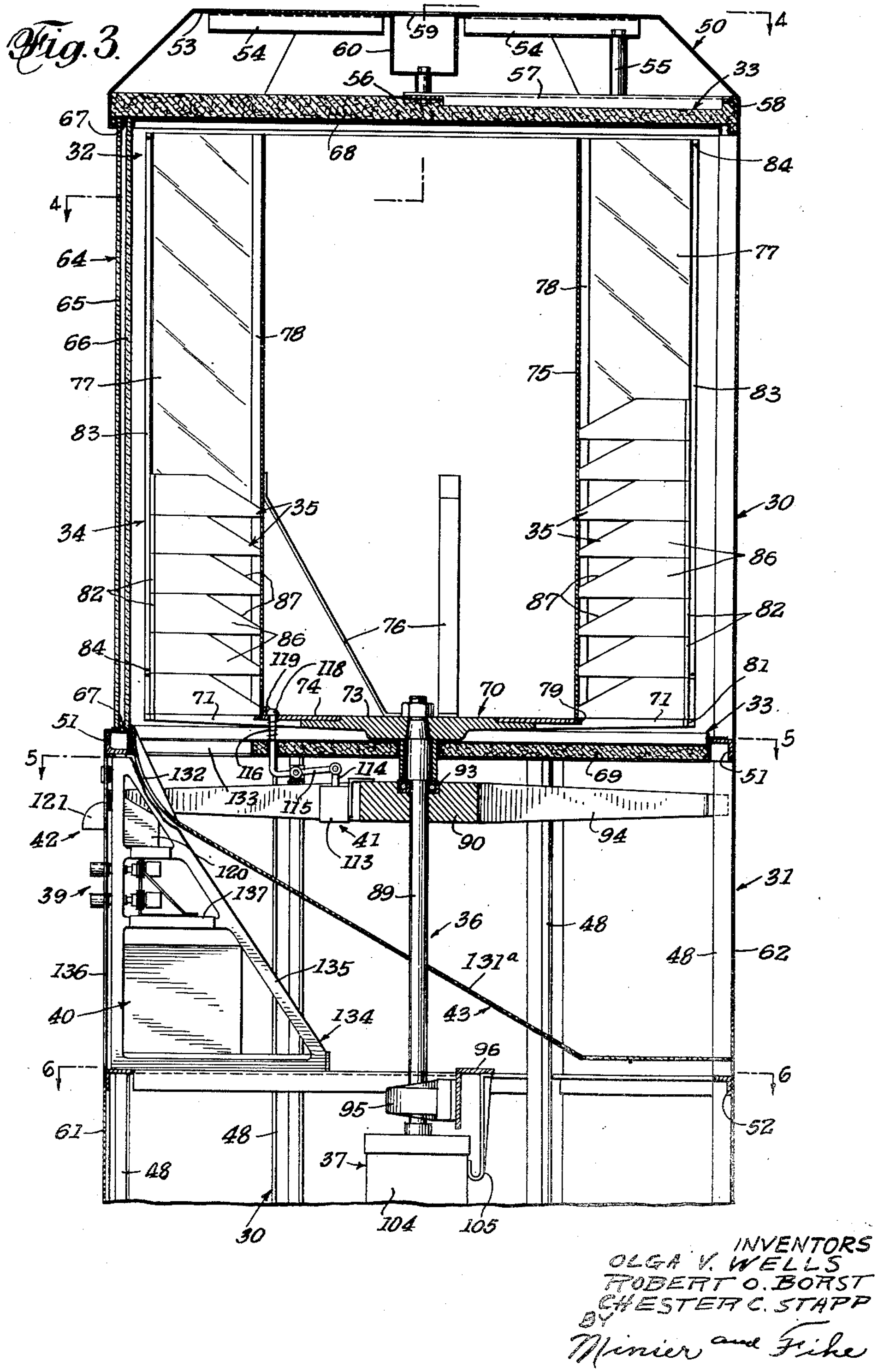
Figure 3 is an enlarged vertical sectional view of the upper portion of the machine.
Figures 4, 5:
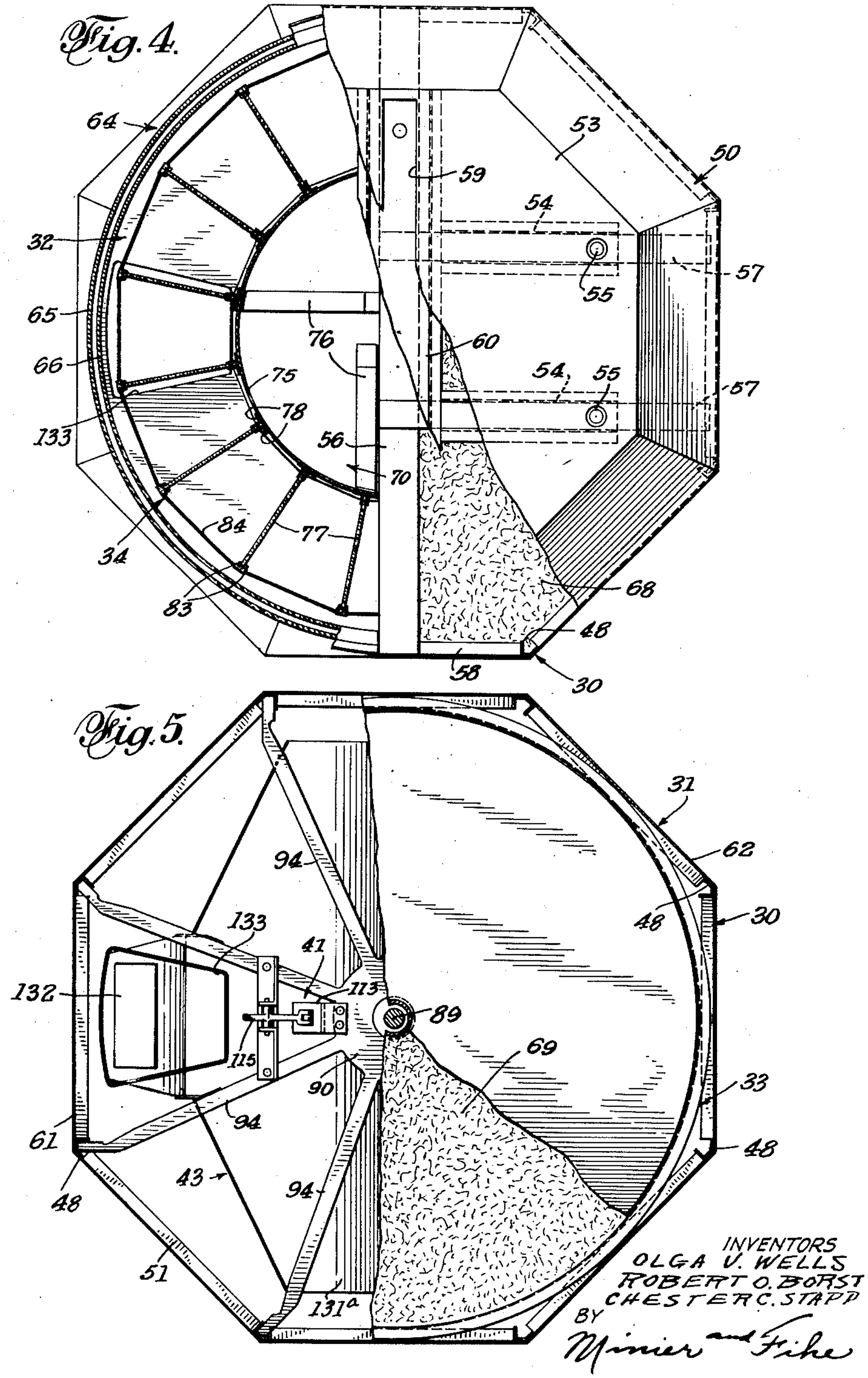
Figure 6:
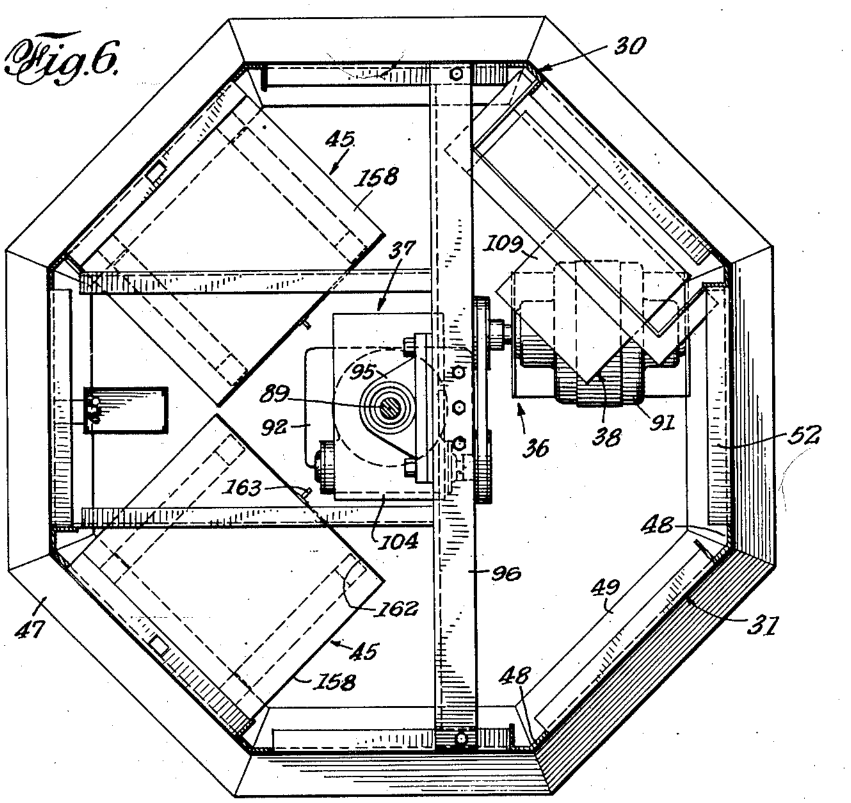

Figures 4, 5, and 6 are plan cross-sectional views as taken substantially on the lines 4—4, 5—5 and 6—6 of Figure 3.

Figure 7:
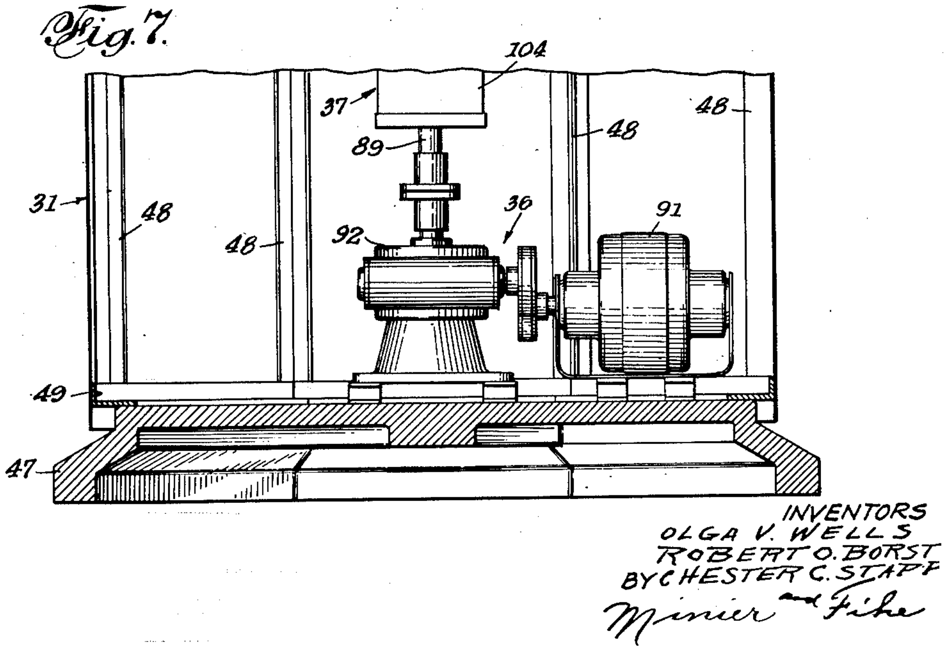

Figure 7 is a vertical sectional view of the lower portion of the machine, said view together with Figure 3 comprising a complete vertical sectional view of the machine.

Figures 8, 9, 10:
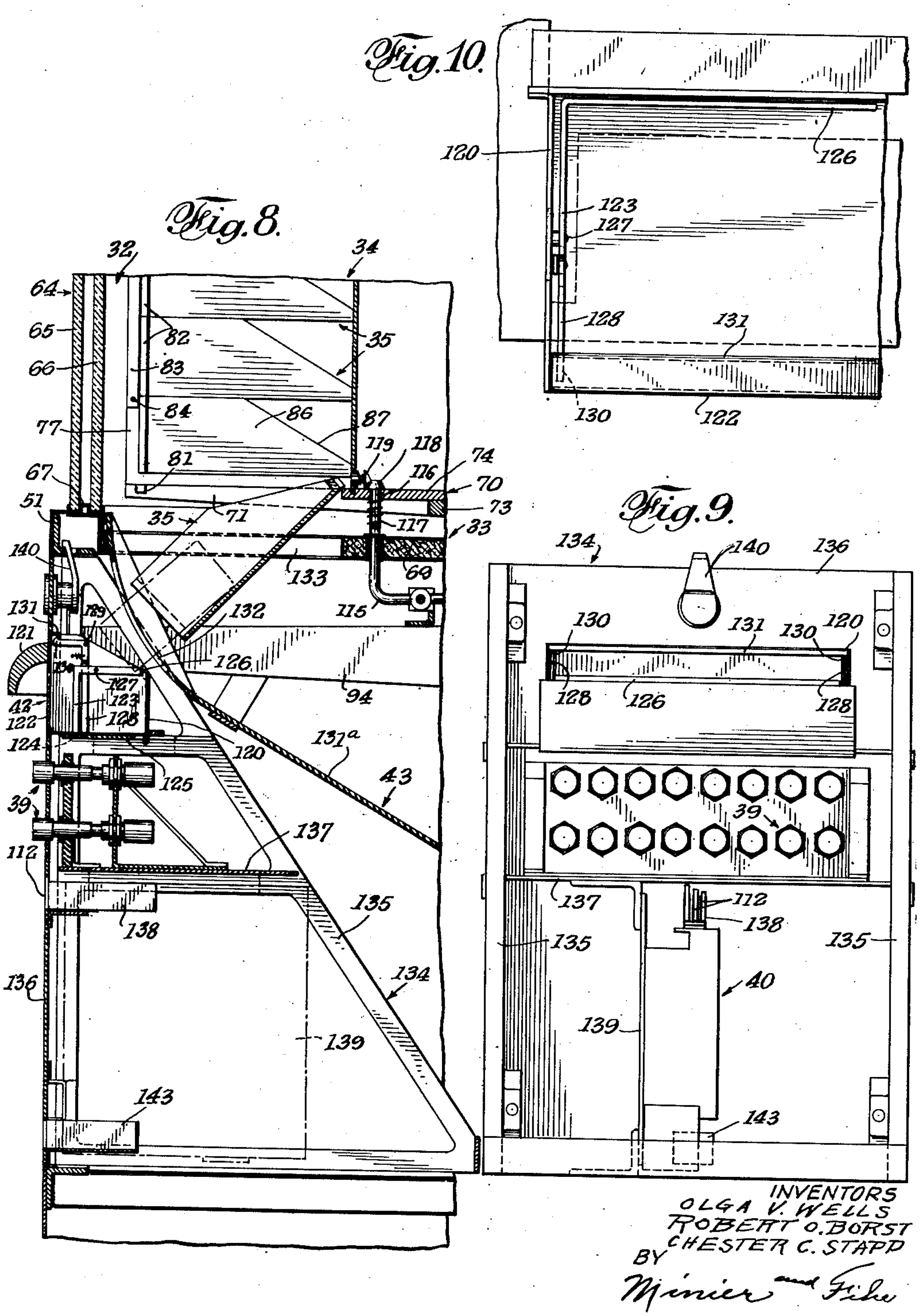

Figure 8 is a further enlarged fragmentary vertical sectional view of dispensing or food package discharging means employed in the invention.

Figure 9 is a partial rear view thereof.

Figure 10 is a still further enlarged broken plan view of means for receiving a dispensed package and from which said package is readily extracted.

Figures 11, 12, 13:
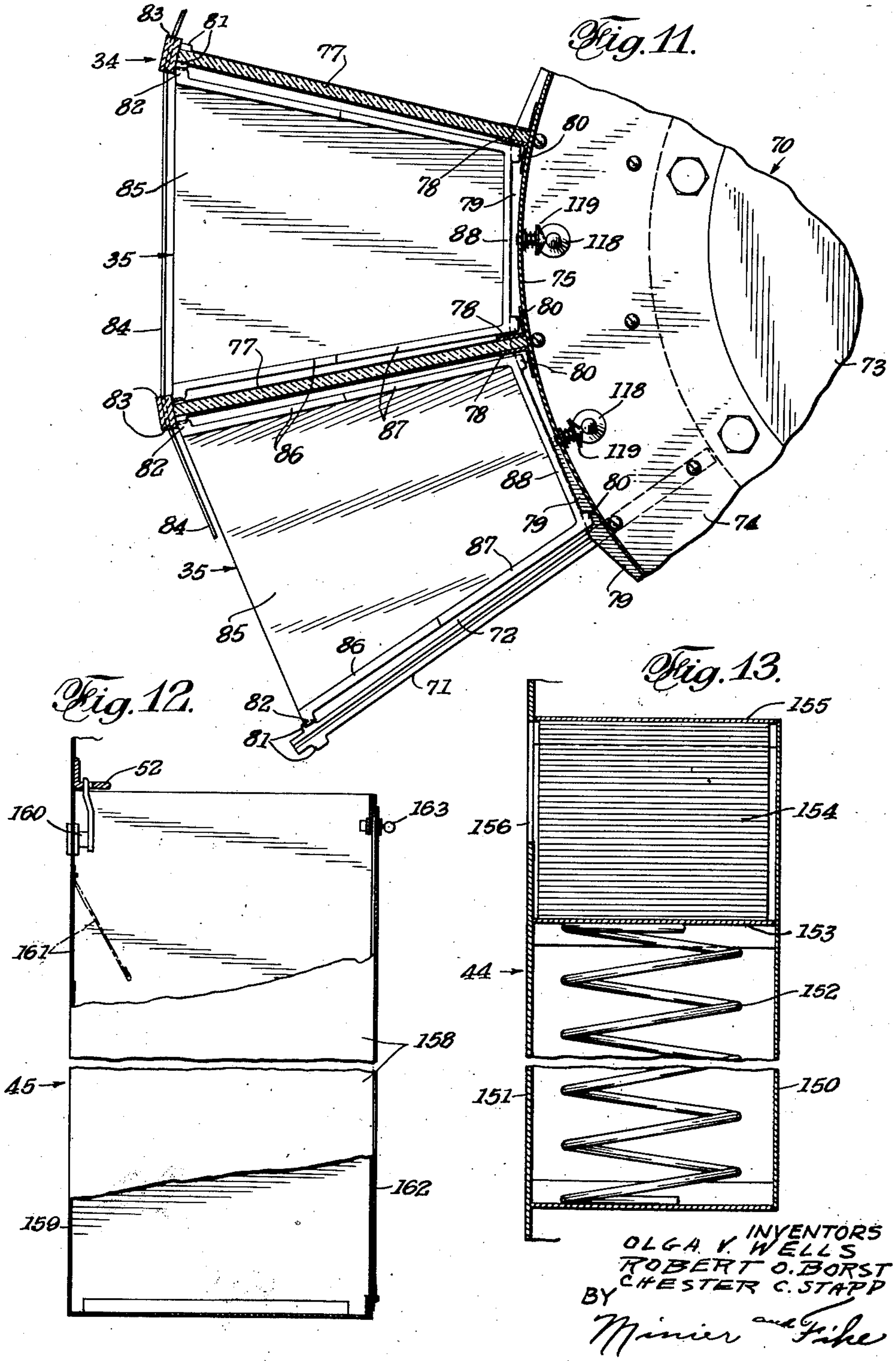
Figure 14:
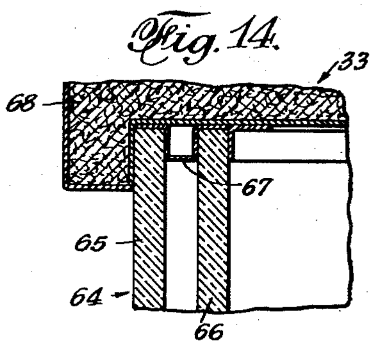
Figure 15:
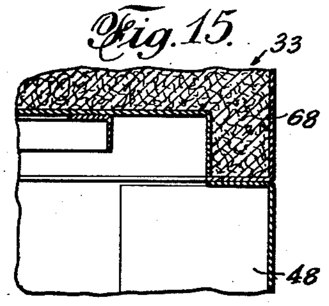
Figure 16:
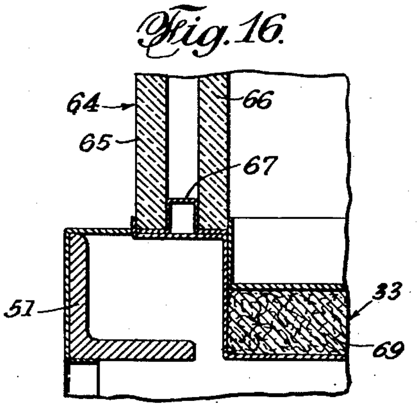
Figure 17:
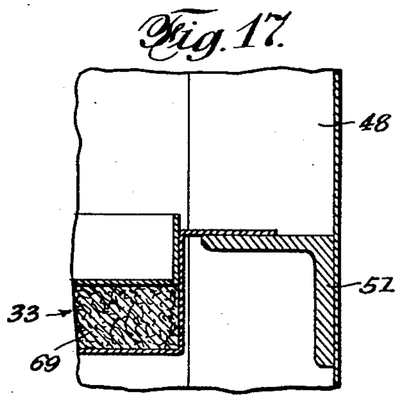

Figure 11 is a broken detailed plan sectional view of a dispensing drum used in the invention.

Figure 12 is a broken, partially elevational and partially sectional view of a waste receptacle used in the invention.

Figure 13 is a similar view of a bag or sack holding unit.

Figures 14 to 19, inclusive, are further enlarged fragmentary detail views showing structural features of the machine.

Figure 20:
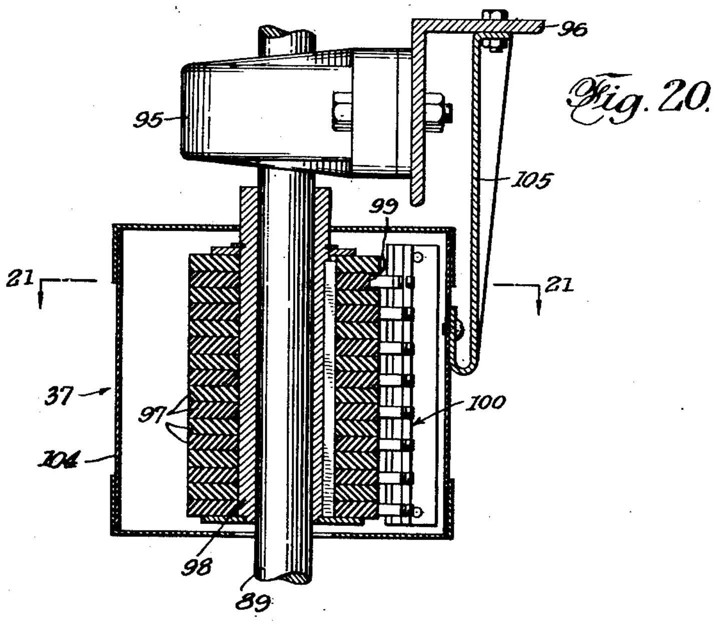

Figure 20 is a vertical sectional view of means electrically controlling the vending operation according to the selection of a customer.

Figure 21:
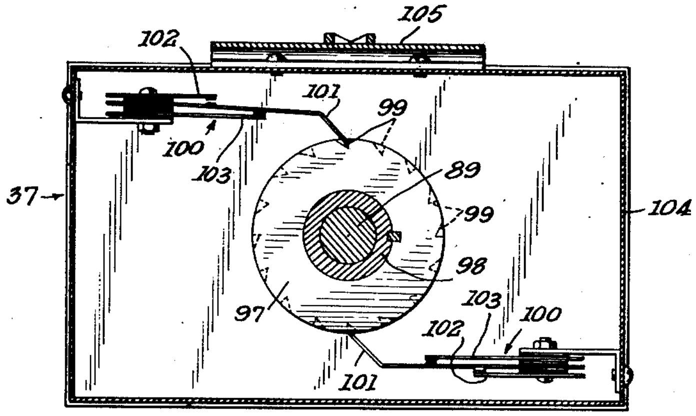

Figure 21 is a plan sectional view thereof as taken on line 21—21 of Figure 20.

Figures 22, 23, 24, 25:
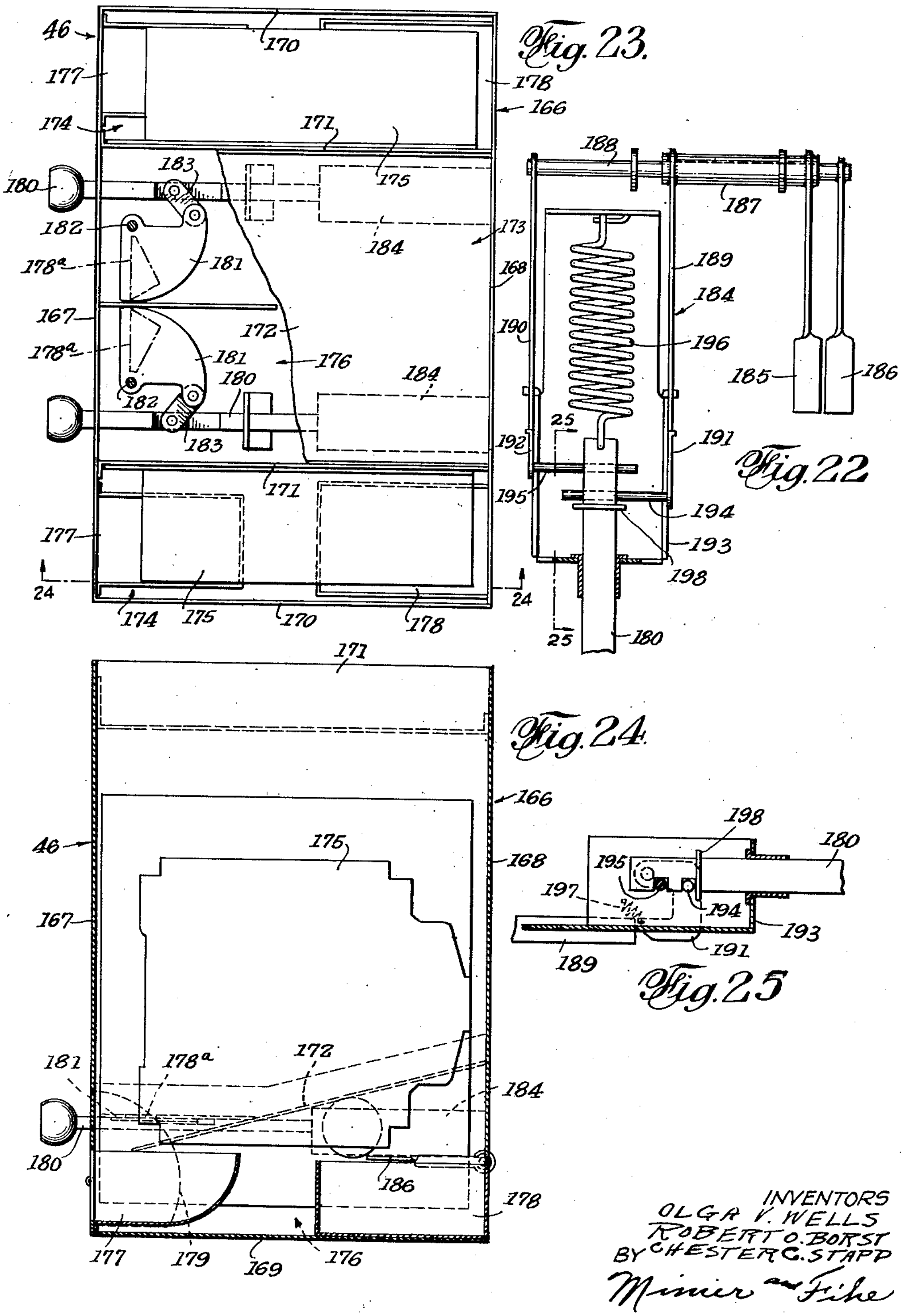

Figure 22 is an enlarged plan view of coin controlled means effecting the operation of the vending unit shown in Figures 23 and 24.

Figure 23 is a plan view of an auxiliary vending unit used in the machine.

Figure 24 is a vertical sectional view thereof as taken on line 24—24 of Figure 23.

Figure 25 is a fragmentary longitudinal sectional view as taken on the line 25—25 of Figure 22.

The vending machine which is shown in the drawings comprises, generally, a support frame 30 provided with enclosure means 31; a food storing compartment 32 in the upper part of the frame; means 33 insulating said compartment to preserve the condition of food therein; a selector drum 34 in which a plurality of trays 35 are mounted for selective vending and which contain a variety of foods; means for effecting selective vending of said trays comprising means 36 for rotating the drum 34; means 37 controlling the rotation of said drum; means 38 in housing 109 comprising a plurality of relays effecting selective operation of the controlling means 37; a selector 39 comprising a plurality of push buttons for operating said relays selectively; coin testing and circuit closing means 40 for closing the relay circuits; electrical means 41 operative upon closing of a selected circuit to effect dispensing of a food filled tray 35; means 42 for receiving said food for extraction by the customer; means 43 for receiving and storing food-emptied trays; and various other components including bag holding means 44; waste compartments 45; auxiliary food dispensing and vending units 46, etc. Although not illustrated, the machine may be provided with attention attracting sign means at the top thereof and include means for illuminating said sign means and various portions of the machine.

The support frame 30 comprises a base 47 and a plurality of upright structural members or posts 48 rigidly connected, as by welding, to a frame 49 mounted on said base. The posts are arranged to provide the machine with eight sides, said posts being located at the vertical corners between adjacent sides. The four rear posts extend to a top cap 50 for the machine, whereas the four front posts terminate at a frame 51 intermediate the height of the machine. A third frame 52 is placed between frames 49 and 51 to further steady and strengthen the support frame. The various structural elements of the support frame are preferably welded together at their joints to provide a strong light octagonal skeleton frame in which the upper front part is open.

The cap 50 is an octagonal sheet metal member, preferably tapered at its top and is set in alignment with the vertical frame posts 48. The top wall 53 of the cap is provided with channel-shaped members 54 on its under surface to stiffen said top wall and serve to effect connection of the cap, by posts 55, to a frame comprising a transverse structural member 56 and members 57 connecting the latter to a top frame 58 of the support frame 30. An elongated slot 59 is formed in the top wall 53 and therebeneath is provided a housing 60 for suitable lamps for illuminating a sign mounted on the machine by means of said slot.

Figure 18:
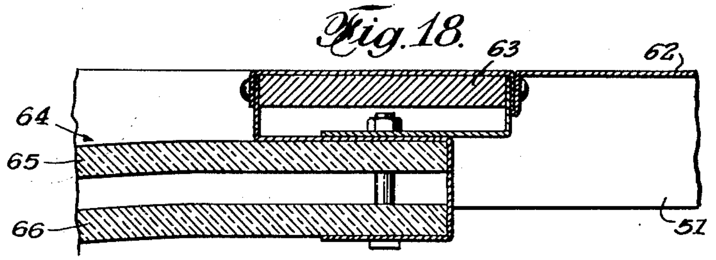
Figure 19:
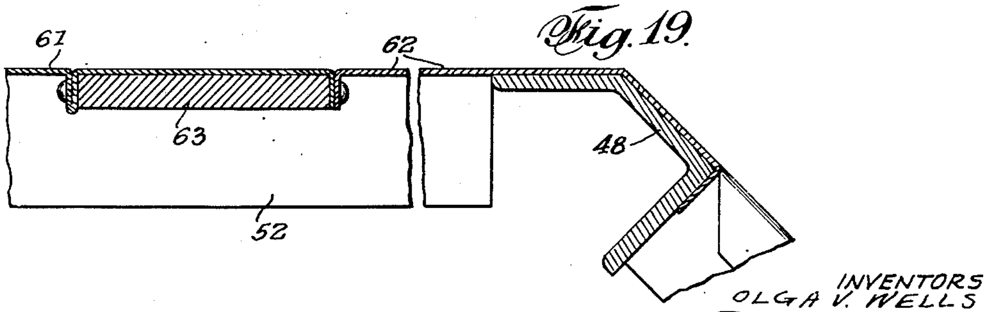

The machine enclosing means 31 comprises sheet metal panels arranged about the posts 48. In practice, the panels are formed in front and rear closure sheets 61 and 62, respectively, connected along the sides of the machine as shown in Figures 18 and 19 by rigid strips 63. The rear sheet 62 extends between the base 47 and the cap 50 whereas the sheet 61 extends from said base to the frame 51.

The opening in the machine thus provided by the support frame 30 and the panel sheets 61 and 62, is enclosed by a semi-tubular transparent window 64. The latter comprises parallel outer and inner members 65 and 66, respectively, spaced at top and bottom by suitably curved spacers 67. Said window completes the frame enclosure and gives visual access to the food compartment 32.

The means 33 for insulating the food compartment 32 includes the mentioned window 64 which is made of insulating material and which is made more effective by the air space between its members 65 and 66. Said means 33 further includes an insulating top panel, 68 in the cap 50, an insulating bottom panel 69 supported by the frame 51, and such other panels of insulation as may be applied on the inner surfaces of the upper portions of the panels of sheet 62. In this manner the food compartment 32 is entirely enclosed by insulation to prevent a rapid heat exchange of the interior thereof with surrounding atmosphere.

The dispensing or selector drum 34 comprises a support plate 70 formed with a plurality of radially directed arms 71 to form a base support for said drum. The arms 71, between them provide generally trapezoid shaped openings 72 therebetween adjacent to the lateral walls of the food compartment. The support plate 70 may be variously formed. As shown, it comprises a central hub plate 73 mounting a ring plate 74 which, in turn, carries the arms 71. A tubular backing drum 75 is mounted on the peripheral edge of the ring plate 74 to extend upwardly from the support plate 70 to clear the bottom of the top insulating panel 68. Suitable angular braces 76 between the inner wall of said backing drum and the top surface of the hub plate, may be provided to lend rigidity to the construction.

Aligned with each arm 71, the dispensing drum is provided with a transparent radial partition 77 secured to the backing drum 75 by means of angle members 78. The dispensing drum is generally coextensive with the height of the window 64 whereby the trapezoidal shaped spaces between the partitions 77 are visible through the window 64.

The food trays 35 are designed to be stacked one above the other in the dispensing drum between the partitions 77. Means are provided for supporting said stacks of trays for selective release and dispensing of the lowermost tray of each stack. For this purpose the peripheral edge of the ring plate 74 is provided with a ledge 79 outward of the backing drum 75 to engage and support rearward lugs 80 on the trays 35; and laterally extending projections 81 are provided on each arm 71 to engage and support laterally extending lugs 82 on the trays. The lowermost tray of each stack is thus supported and, in turn, supports a stack of trays between the partitions 77.

The outer edge of each partition 77 is provided with lateral projections 83 which serve to retain the trays in position to prevent inadvertent outward displacement thereof. The partitions are securely held in radial position by upper and lower wires 84 strung peripherally about the drum as indicated. The projections 83 extend downward to a point somewhat above the top of the lowermost tray of each stack whereby said lowermost tray can be slid laterally outward so that its respective lugs 82 and 80 successively lose contact with the projections 81 and the ledge 79 as shown in Figure 8 whereby said tray will tip and then fall to discharge its contents into the food receiving means 42. The empty tray then falls upon the means 43.

Each tray 35 comprises a trapezoidal bottom wall 85, side walls 86 provided with a rearward slope 87 and a relatively low rear wall 88 in addition to the mentioned lugs 80 and 82.

The means 36 for rotating the selector drum 34 comprises a vertical drive and support shaft 89 for the drum, a support 90 for the shaft, an electric motor 91 and reduction gearing 92 connecting the motor to drive the shaft 89. The shaft extends through the insulating panel 69 and is supported by a thrust bearing 93 in the support 90 which comprises a spider formed with generally radial arms 94 for lightness. The arms of said spider are connected to the posts 48 to afford a rigid mounting for the selector drum 34.

The means 37 for controlling the rotation of the drum 34 and for arresting said rotation to bring a selected tray stack in alignment with the food receiving means 42, is mounted on the shaft 89 between the reduction gearing 92 and a bearing 95 on a cross bar 96 carried by the frame 52. Said means 37 comprises a plurality of discs 97 keyed to a sleeve 98 on said shaft, each disc being provided with a peripheral notch 99 for control of respective switch jacks 100 for electrical connection with the circuit controlling either the motor 91 or the means 41 effecting dispensing of the lowermost tray 35 of a selected stack. Accordingly, the notches 99 are differently oriented with relation to their respective switch jacks so that a different tray stack is aligned with the means 42 for each related association of the notches and switch jacks.

Each switch jack 100 comprises a spring finger 101 adapted for normal contact with a terminal 102 and for contact with a terminal 103 when the finger 101 enters the notch 99. The discs 97 are enclosed in a housing 104 which mounts the switch jacks 100 and which is supported by a hanger 105 from the supporting angle 96.

The means 41 comprises a unit mounted on the support 90 and designed, upon the closing of a selected operating circuit, to cause displacement of a tray from a stack thereof in vending position. Said means comprises a solenoid 113, the core 114 of which operates a bellcrank lever 115 to push a pin 116 which is normally downwardly tensioned by a spring 117, so that a conical bead 118 on said pin 116 laterally presses a tray displacing pin 119 mounted on the backing drum 75 and aligned for engagement with the rear wall 88 of the lowermost tray 35 of each stack. Accordingly, upon energization of the solenoid 113, only that tray of a stack aligned with the lever 115 will be displaced by movement of said lever.

The means 42 comprises a drawer 120 provided with a pull handle 121 whereby the drawer, upon receiving a package of food from a tray 35 dislodged from the selector drum, can first be pulled outwardly which effects release of its front pivoted wall 122 for access to the interior and ready extraction of said food package. The drawer is normally held against movement by a latch dog 123 on either side thereof engaged with abutments 124 formed in a support plate 125 for the drawer. Said latch dogs 123 are connected by a transversely extending bail 126 which is so positioned as to be depressed by the weight of a food package to cause the latch dogs to be tilted on their pivots 127 and to be raised from engagement with their abutments. The drawer is thus freed to be slid forward by a pull on the handle 121. Latches 128 are provided for the pivoted front door 122. When said latches 128 encounter the mentioned abutments 124, they will pivot at 129 to release integral dogs 130 from holding engagement with rib 131 of the door whereby said door can be opened on its pivot. When the drawer is slid back into place, it will be effectively latched ready to receive the next package of food slid into it by a displaced tray 35.

The means 43 comprises a transverse partition in the machine disposed beneath the support 90. Said means is formed with a sloping wall 131ª to guide falling trays toward the rear of the machine to be collected for future use. The sloping wall 131ª, at its upper forward end is formed with an opening 132 sufficiently large to receive a food package but too small for a tray to pass therethrough. The insulating wall 69, however, is provided with a tray passing opening 133 of sufficient size to pass a tray.

In order to facilitate servicing of the machine, the selector 39, the coin detection means 40 and the food receiving means 42 are incorporated in a single unit 134 adapted for removable mounting in the machine. Said unit, best seen in Figures 3, 8 and 9, comprises a frame of generally triangular shape formed with side brackets 135 connected by a front wall 136, by a transverse wall 137 mounting the push buttons 110 of selector 39, and the mentioned support plate 125. The coin slots 112 in the front wall 136, are arranged with coin guides 138 for suitable guiding of coins to the means 40 which is mounted on a vertical wall 139 supported in the unit 134. A suitable lock 140 is provided for removable connection of said unit and the machine frame 30.

In operation, the proper coins are inserted in coin slots 112 and that particular push button 110 is manually depressed which will bring a desired stack of food trays 35 in dispensing position. The coin tester 40 and said depressed push button 110 will close the circuit through an associated relay. The coin permitting energization will be dislodged from its energizing position immediately after completion of such functions as is normal in such coin-controlled circuits. It will be further understood that whereas insertion of a five-cent piece will permit but one push-button energization, a larger coin will allow multiple operation. This circuit is in series with the secondary of a transformer which is of the step down type. Said circuit is therefore of low voltage. Energization of said relay will cause closing of a switch so that line current can pass through a relay operating the motor 91, through the terminal 102 and finger 101 connected with the closed switch, and power line. The selector drum will thus be caused to rotate until said finger 101 falls into its associated notch 99 to open the motor circuit and cause contact between the finger 101 and its associated terminal 103. Circuit is thus made through the trip solenoid 113 to effect dislodgement from the stack aligned in dispensing position of its lowermost tray and to cause said tray to fall through opening 133 so that its package of food will pass through opening 132 and into drawer 120.

Since all of the other push buttons 110 are unactuated, all of the other circuits are open and the drum 34 will stop only in a position controlled by the relative orientation of the notches 99. If desired, suitable means preventing depressing of more than one push button, may be incorporated in the mechanism.

Slugs or false coins will not act to close the cicuit in the coin tester 40 but will be returned to the customer in a return cup 143.

Although not inter-connected with the above-described food vending mechanism, the machine is brought to fuller completion by the incorporation of the mentioned bag holding means 44, the waste compartments 45 and the auxiliary food dispensing and vending means 46.

Figure 1:
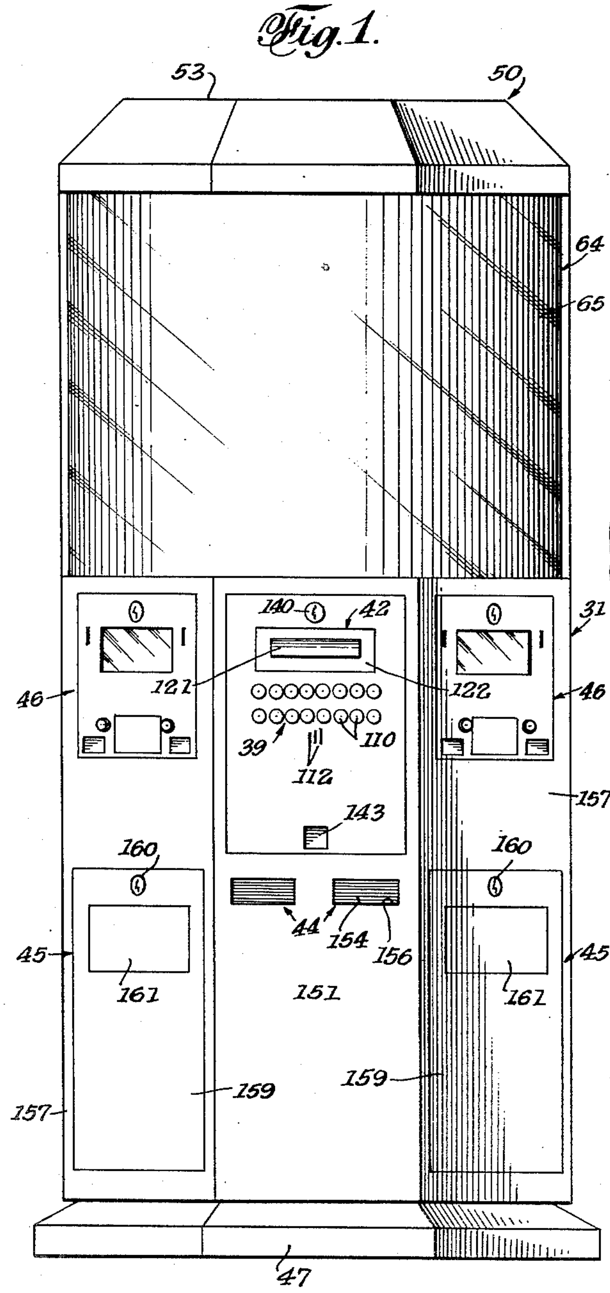
Figure 1 is a front elevational view of a vending machine according to the invention.
Figure 2:
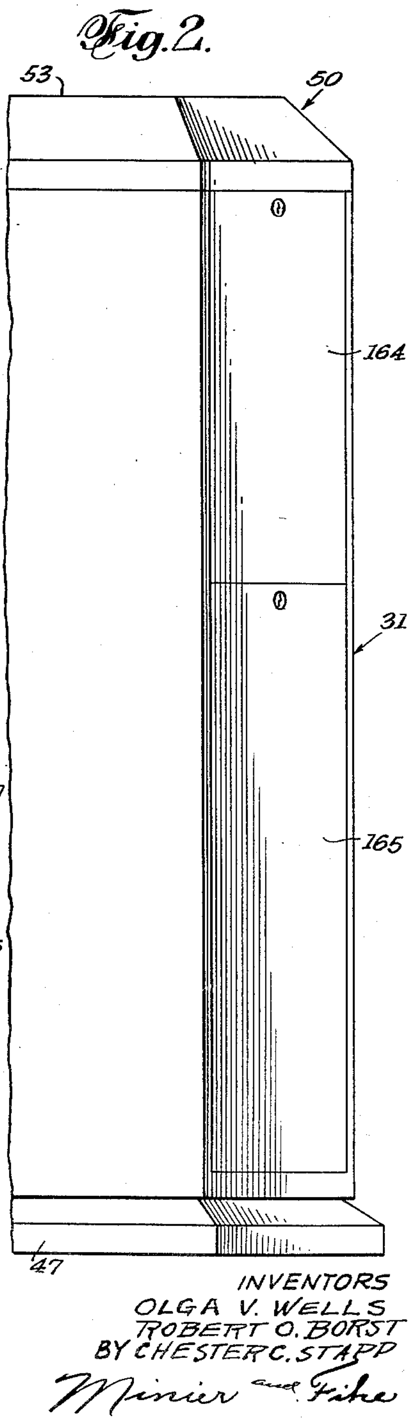
Figure 2 is a broken rear elevational view thereof.

As shown in Figures 1 and 13, the bag holding means 44 comprises a housing 150 mounted on the inside of the front panel 151 of the machine, the upper part of said panel 151, mounting the unit 134 (Fig. 3). The housing 150 is provided with an expansion spring 152 for the purpose of upwardly urging a plate or follower 153 guided by the walls of the housing. By stacking a plurality of bags 154 on the plate 153 said spring will compress said stack against the top wall 155 of the housing and hold said stack for the manual extraction of a bag therefrom through a front opening 156 in the wall panel 151. One or more of such bag holding means may be provided for the same or different sizes of bags.

The waste compartment or receptacle 45 may be mounted on either or both of the wall panels 157 adjacent the wall panel 151. As shown in Figures 1 and 12, each receptacle comprises a container 158 having a front wall 159 designed to fill a suitable opening in its respective panel 157 and to be removably locked in place by a lock 160 engaged with the machine frame 52. An inwardly swingable front access door 161 is provided whereby waste may be deposited in the container 158 from the outer front of the machine. The container can be emptied either by removing it from the machine or by lowering a bottom-hinged rear door 162 upon release of a latch 163. For this purpose and for other access purposes to the interior of the machine, the rear closure wall 62 is provided with respectively upper and lower removable access panels 164 and 165. By removing the upper panel 164, the machine can be refilled with food containing trays 35. The lower panel affords access to the empty trays held by means 43.

The auxiliary vending unit 46 is best seen in Figures 1 and 22 to 25, inclusive. Said means is designed to vend loose items of food such as nuts and one such unit is mounted in a suitable opening in each closure panel 157.

The unit 46 comprises, generally, a housing 166 having a front wall 167, a rear wall 168, a bottom wall 169, side wall 170, vertical transverse partitions 171, and a horizontal and partly sloped article supporting wall 172. In this manner, the housing is divided into a central upper article holding chamber 173, side compartments 174 for housing coin units 175, and an operating compartment 176 beneath the wall 172 and between partitions 171.

In each compartment 174 and beneath the coin testing unit 175, there is positioned a coin returning tray 177 and a coin receptacle 178.

Means are provided for vending articles in the chamber 173 by allowing the contents thereof to pour through openings 178ª into a tiltable receptacle 179 provided in the front wall 167 of the unit. One such vending means is provided on each side of the chamber 173 to be controlled in its operation by coins deposited in the adjacent coin testing unit 175.

Each of the vending means includes a manually projectable plunger 180, a gate plate 181 controlling its respective opening 178ª, mounted to be rocked on a pivot 182 and connected by a link 183 to its respective plunger. Means 184 controlled by coins passing through the means 175 normally maintains said plunger locked. Said means comprises a pair of levers 185 and 186 mounted on co-axial shafts 187 and 188 and connected with respective release levers 189 and 190. The levers 189 and 190 are respectively associated with pivoted members 191 and 192 mounted on opposite sides of a frame 193 into which the rear end of the plunger 180 projects. Pins 194 and 195 carried by the respective members 191 and 192 are engaged with notches in plunger 180. A spring 196 serves to draw the plunger rearward to hold the gate plate 181 in closure position with respect to the opening 178ª. It will be obvious that only upon a coin coming into contact with both levers 185 and 186 to depress them and to cause depressing of the levers 189 and 190, will springs 197 of the members 191 and 192 become effective to tilt said members and remove pins 194 and 195 from engagement in the slots of plunger 180. The plunger is then free to be manually pulled to allow dispensing of articles from chamber 173 into receptacle 179 from which said dispensed articles can be readily removed. The movement of the plunger 180 is limited by a stop plate 198 thereon abutting a wall of the frame 193. Manual release of the plunger permits spring 196 to restore the parts to locked retracted position for subsequent operation.

The above-described embodiment of the invention may be varied in many ways without departing from the spirit and scope of the invention. Accordingly, we desire to include such modifications that may fall within the scope of the appended claim.

We claim:

In a vending machine in combination, a rotatable support, a plurality of stacks of food holding trays carried by said support, means for dislodging the lowermost tray of a selected stack, a food-receiving drawer, means for causing said tray to tip to slide its contents into said drawer, means for discharging the tray from said support, means locking said drawer in contents-receiving position, and means operated by discharge of said contents into the drawer for releasing the drawer for manual movement thereof.

OLGA V. WELLS.
ROBERT O. BORST.
CHESTER C. STAPP.

References Cited in the file of this patent

UNITED STATES PATENTS

| Number | Name | Date |
|---|---|---|
| 673,760 | Conner | May 7, 1901 |
| 737,665 | Rupley | Sept. 1, 1903 |
| 892,687 | Schrum | July 7, 1908 |
| 993,021 | Brown | May 23, 1911 |
| 1,114,465 | Glashagel | Oct. 20, 1914 |
| 1,240,595 | Perfect | Sept. 18, 1917 |
| 1,586,936 | Wisroth | June 1, 1926 |
| 1,627,424 | Binder | May 3, 1927 |
| 1,644,371 | Goldman | Oct. 4, 1927 |
| 1,683,360 | Lea | Sept. 4, 1928 |
| 2,115,393 | Mahaffey | Apr. 26, 1938 |
| 2,272,750 | Miller | Feb. 10, 1942 |
| 2,290,275 | Childers | July 21, 1942 |
| 2,360,241 | Kuhl | Oct. 10, 1944 |
| 2,363,340 | Lau et al. | Nov. 21, 1944 |
| 2,378,868 | Richmond et al. | June 19, 1945 |

FOREIGN PATENTS

| Number | Country | Date |
|---|---|---|
| 192,714 | Great Britain | Sept. 13, 1923 |